April 7, 1931.  A. H. CANDEE ET AL  1,799,883
GEAR CUTTING MACHINE
Filed May 24, 1929  3 Sheets-Sheet 1

INVENTORS
ALLAN H CANDEE &
MAGNUS H JOHANSON
BY
ATTORNEY

April 7, 1931.  A. H. CANDEE ET AL  1,799,883
GEAR CUTTING MACHINE
Filed May 24, 1929   3 Sheets-Sheet 2

INVENTORS
ALLAN H. CANDEE &
MAGNUS H. JOHANSON
BY
ATTORNEY

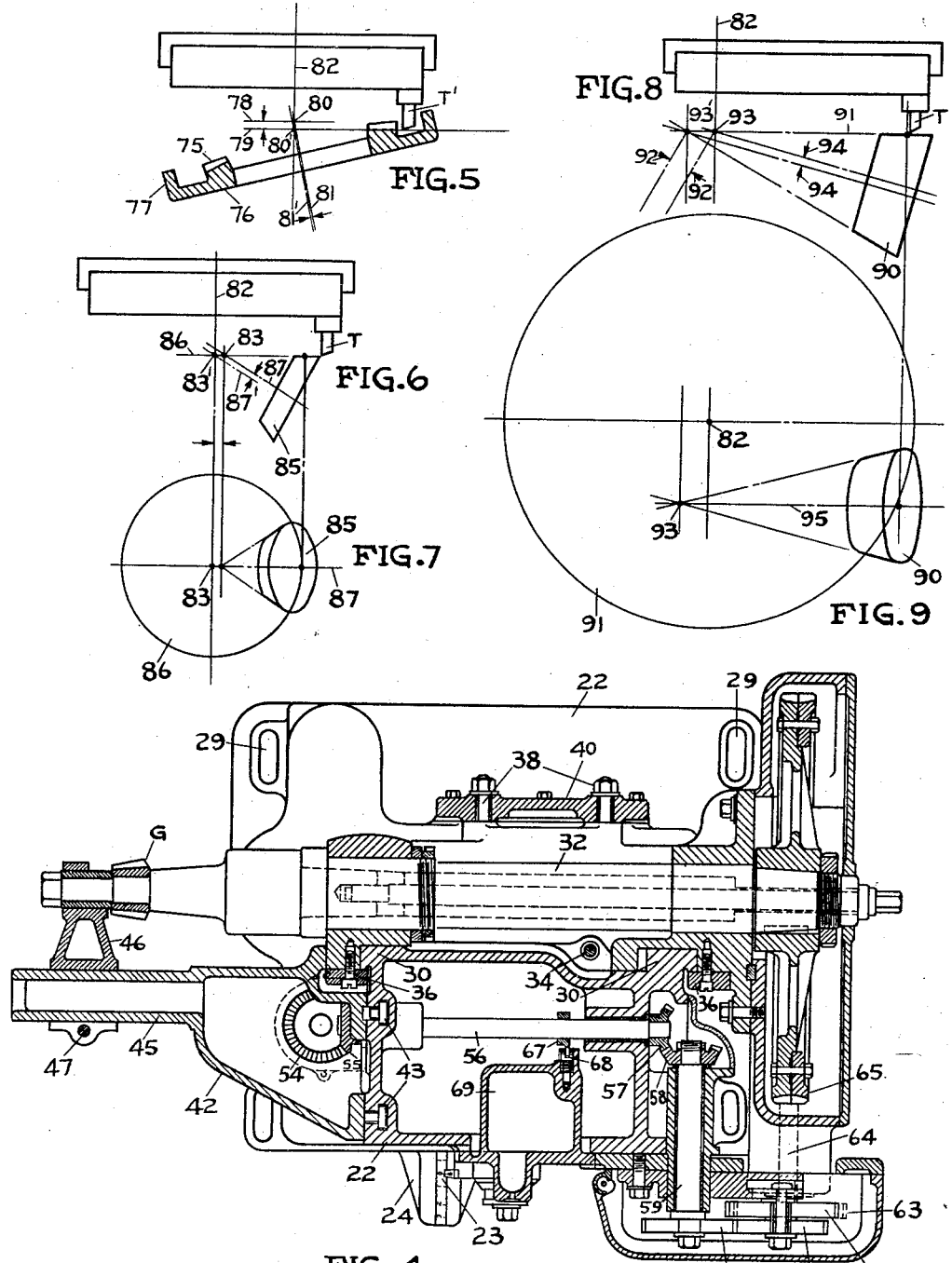

Patented Apr. 7, 1931

1,799,883

UNITED STATES PATENT OFFICE

ALLAN H. CANDEE AND MAGNUS H. JOHANSON, OF ROCHESTER, NEW YORK, ASSIGNORS TO GLEASON WORKS, OF ROCHESTER, NEW YORK, A CORPORATION OF NEW YORK

GEAR-CUTTING MACHINE

Application filed May 24, 1929. Serial No. 365,673.

The present invention relates to machines for producing tapered gears, such as bevel and hypoid gears.

The primary purpose of the present invention is to provide a gear cutting machine which will be very flexible in use and which will lend itself readily to the cutting of different types of bevel and hypoid gears. To this end, the usual axial and angular adjustments of the work head are provided and in addition, an adjustment in a direction perpendicular to the work spindle to move the work spindle laterally toward or away from the cutting plane.

In the drawings:

Figure 4 is a sectional view on the line 4—4 of Figure 2; and

Figure 1:
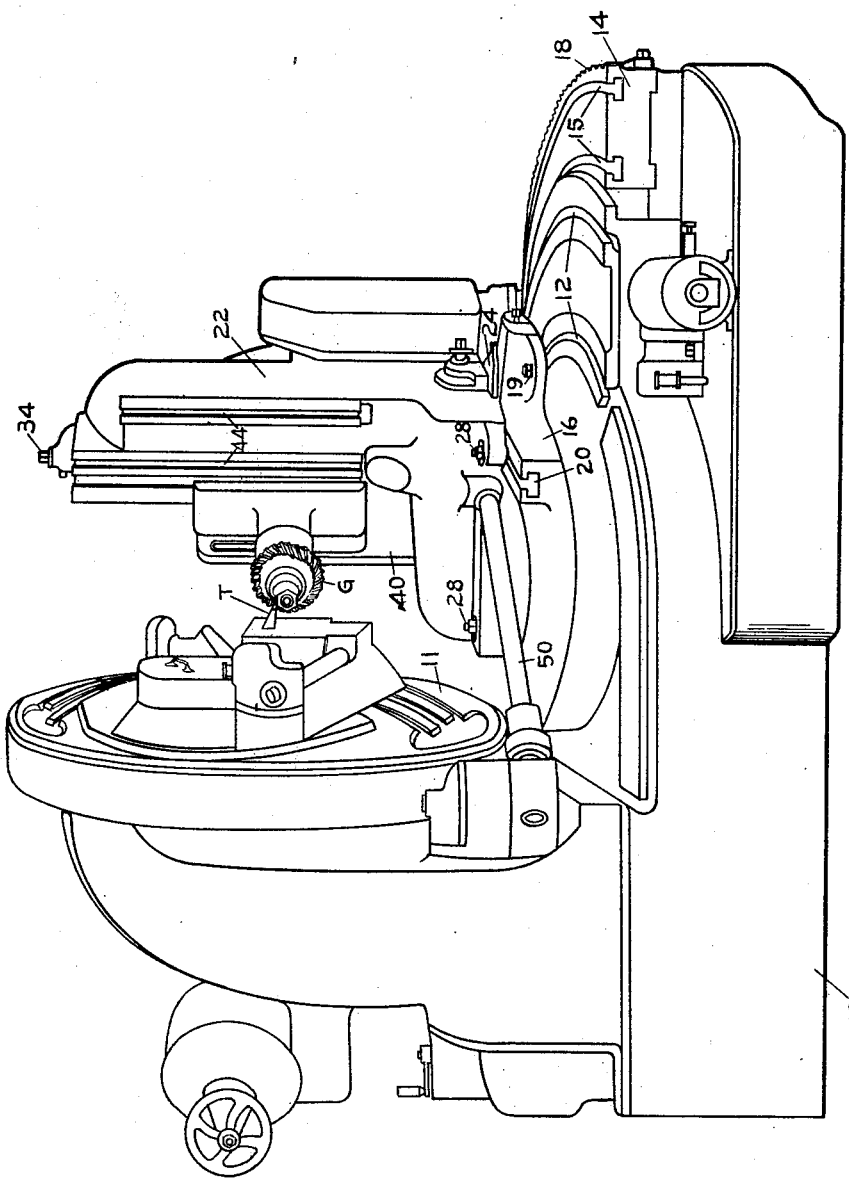
Figure 1 is a perspective view of a single tool bevel and hypoid gear planing generator constructed according to this invention.

Figures 5 to 9 inclusive are diagrammatic views illustrating how a machine constructed according to this invention may be used in the cutting of various types of bevel and hypoid gears.

The machine illustrated in the accompanying drawings is a single tool planing generator operating on the basic principle described in U. S. Patent No. 1,616,439, issued to the present inventors February 8, 1927. The tool is a planing tool and is reciprocated by a crank and the blank is given a continuous indexing rotation, so that the tool cuts in a different space of the blank on each workstroke. The tool is mounted on the cradle and there is imparted to the cradle, in addition to the uniform rotary motion which acts in conjunction with a uniform rotary motion imparted to the blank to generate the tooth profiles, an oscillatory motion under actuation of an eccentric. The longitudinal tooth curve produced on the blank is a resultant of the motion of the tool at a variable velocity under actuation of the crank, the uniform rotary motion of the blank due to continuous indexing and the oscillatory motion of the cradle at a variable velocity under actuation of the eccentric. While the present invention is described in connection with this type of machine, it is capable of quite general application. It may be used on bevel and hypoid gear generators generally irrespective of the form of tool used or of the relative motions employed in the machine. It may be used, also, in bevel and hypoid gear cutting machines where a generating motion is not used, as in bevel gear machines of the forming type where the tooth profile curvature is reproduced from a templet or form.

In the machine illustrated, T indicates the planing tool, G the gear blank to be cut, 10 the frame of the machine and 11 the cradle. The means for adjusting the tool so as to cause it to move in the desired offset path, the means for reciprocating the tool, the means for swinging the tool to and from cutting position, the means for actuating the cradle, the means for maintaining the timed relation between the tool and work during the cradle movement, etc., are not illustrated as they form no part of the present invention. Reference may be had to the above mentioned patent for a description of one embodiment of such means in a machine of the type illustrated in the drawings of the present application. The present invention deals with the means whereby the work is adjusted relatively to the tool.

That portion of the frame 10 of the machine on which the work-head and its supports rest is formed on its upper face with arcuate slots 12 which are curved about an axis perpendicular to the axis of the cradle and constituting the vertical center line of the machine. Secured to the frame 10 is a feed-rail 14 which is also formed on its upper face with arcuate slots, designated at 15, curved longitudinally about the vertical center line of the machine.

Mounted on the frame 10 for angular adjustment thereon is a pivoted base 16 which is adjustable on the frame about the vertical axis already referred to. The base 16 is moved on the frame by a pinion (not shown) which meshes with the circular rack 18 formed on the feed-rail 14 and the base 16 is secured in any position of its angular adjustment by means of T-bolts 19 which engage in T-slots 12 and 15 of the frame and rail. The means for adjusting the base on the frame and securing it in any adjusted position are similar to those described in the patent already mentioned.

The base 16 is formed on its upper face with T-slots 20.

Figure 2:
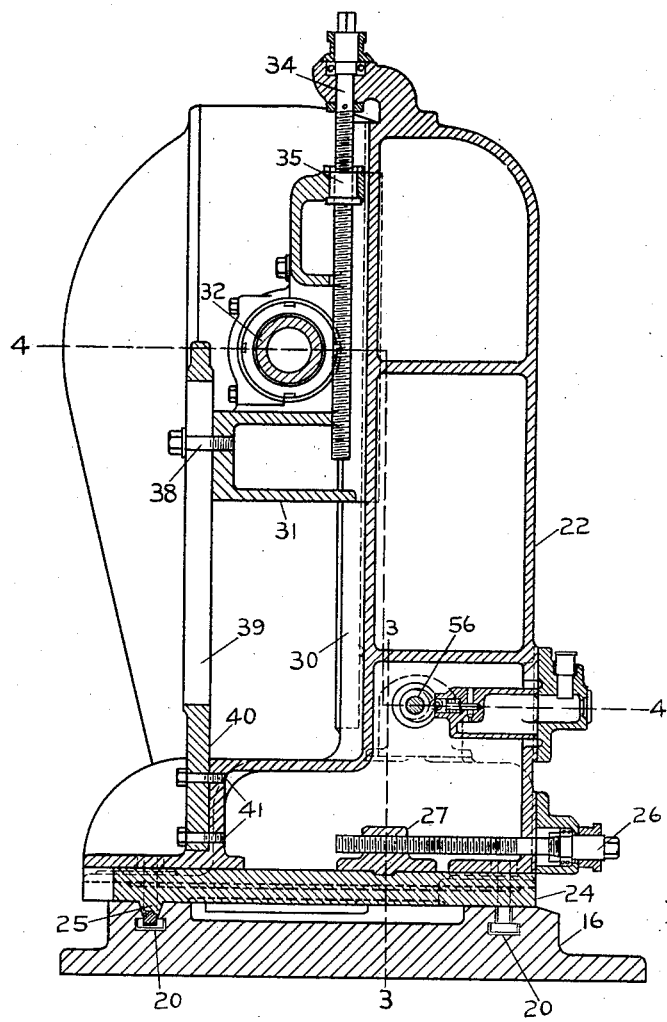
Figure 2 is a vertical sectional view through the work head end of this machine.
Figure 3:
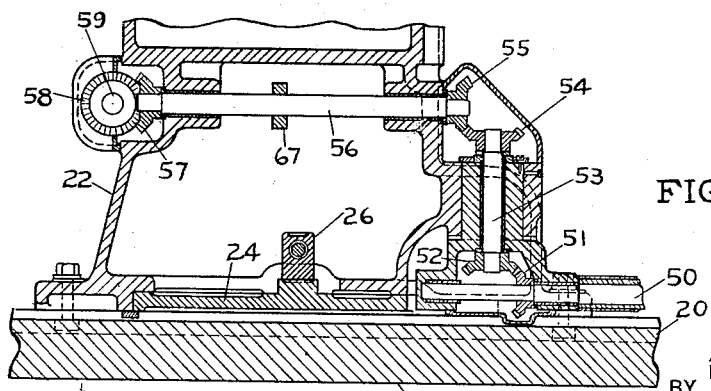
Figure 3 is a fragmentary sectional view taken on the line 3—3 of Figure 2.

Mounted on the base 16 for sliding adjustment thereon in the direction of the slots 20 is a work head carrier 22. The base of the work head carrier 22 is recessed between its ends to receive a plate 24 (Figs. 1, 2, 3 and 4) which extends transversely of the slots 20.

The plate 24 is held against movement transversely of the slots 20 by means of a tongue 25 (Fig. 2) formed integral with the plate which engages in one of the slots 20. The work head carrier 22 is adjustable with reference to the plate 24 in a direction perpendicular to the slots 20. This adjustment is effected by means of the screw 26 which is journaled in the work head carrier and threads into a nut 27 which is secured to the plate 24. This nut 27 is held against movement relative to the plate 24 by means of screws not shown and a lug shown clearly in Figures 2 and 3, which engages in a recess in the upper face of a ridge portion formed on the plate 24 intermediate its sides. The indicator and scale designated at 23 in Figure 4 make it possible to set the carrier 22 relative to the plate with precision.

With the construction described, the carrier 22 and plate 24 are adjustable together in a direction longitudinal of the slots 20 and the carrier 22 is adjustable relative to the plate 24 in a direction perpendicular to the slots 20. The carrier is secured in any adjusted position by means of bolts 28 which pass through slots 29 formed in its foot and extending transversely of the T-bolt slots 20.

The work head carrier is in the form of a column or upright which is provided at one side with vertical ways 30 (Fig. 4). The work-head 31, in which the work spindle 32 is journaled, is adjustable on the ways 30 of the work head carrier 22. This adjustment is effected by rotation of the screw 34 (Fig. 2) which is rotatably mounted on the work head carrier 22 and which threads into a nut 35 that is secured to the work head 31. This adjustment is for the purpose of changing the vertical position of the axis of the work spindle relative to the axis of the cradle 11. The work spindle may be adjusted so that its axis intersects the axis of the cradle or so that its axis is offset above or below the axis of the cradle. The gibs 36 (Fig. 4) hold the work head on the ways 30 and the work head is secured in any adjusted position by means of these gibs and the bolts 38 which are secured in the work head and which pass through vertical slots 39 formed in the plate 40 (Figs. 2 and 4) which is secured to the column 22 by the bolts 41.

The gear blank G to be cut can be secured to the work spindle 32 in any desired manner. For some jobs, it may be desirable to use a steady-rest to support the outer end of the work spindle. The steady-rest which is omitted in Figure 1 but shown in Fig. 4 includes the bracket 42 which is adjustable vertically on the work head carrier 22 and which is secured in any adjusted position on the work head carrier by means of the T-bolts 43 which engage in the vertical T-slots 44 (Fig. 1) formed on the face of the work head carrier. The bracket 42 is formed with an arm 45. This arm 45 supports the rest 46 in which the outer end of the work spindle takes its bearing. The rest 46 is secured in any position of adjustment on the arm 45 by means of a split clamp which is formed integral with the rest 46 and grips the arm 45, when the screw 47 is tightened.

The drive to the work spindle for the purpose of imparting the continuous indexing and generating motions to the work forms no part of the present invention. One form of such drive is, however, illustrated and may be briefly described here. 50 indicates a sliding shaft driven in timed relation with the tool reciprocation. This shaft carries at the work-carrier end (Fig. 3) the bevel gear 51 which meshes with and drives a bevel gear 52 on a vertical shaft 53 which carries at its upper end a miter gear 54. The miter gear 54 meshes with and drives a miter gear 55 on a horizontal shaft 56. This shaft 56 carries a miter gear 57 which meshes with and drives a miter gear 58 on a shaft 59. The shaft 59 (Fig. 4) is connected by the index change gears 60, 61, 62 and 63 with the index worm shaft 64 which carries the index worm (not shown) that meshes with and drives the index worm wheel 65 which is keyed to the work spindle 32. The shaft 56 carries intermediate its end (Figs. 2, 3 and 4) a cam 67 which actuates a spring plunger 68 to pump oil from a reservoir 69 (Fig. 4) to the various bearings on the work end of the machine.

The angular adjustment of the pivoted base 16 on the frame 10 of the machine is usual in bevel gear and hypoid gear cutting machines for the purpose of bringing the work into the cutting plane of the tool. The sliding adjustment of the work head carrier 22 on the pivoted base 16 in the direction of the ways 20 is also a customary adjustment found in bevel gear and hypoid gear cutting machines and is employed for adjusting the work axially, as in setting for the correct cone distance etc. The adjustment of the work head 31 on the column 22 is incorporated in machines for cutting hypoid pinions to permit offsetting the pinion axis above or below the axis of the generating gear, represented by the axis of the cradle. The lateral adjustment of the work head carrier 22 relative to the plate 24 is, however, new in itself and new in combination with the several other adjustments described. Through the use of this adjustment, it is now possible to cut correctly many jobs which it was impossible to cut accurately on bevel or hypoid gear cutting machines of previous constructions.

Figure 5 shows a job such as a gear manufacturer is sometimes called upon to cut. Here the gear teeth 75 are to be cut on a plate 76 which is formed with a peripheral flange 77. In cutting an ordinary bevel gear, the blank would be positioned so that its root surface was tangent to the plane indicated by the line 78 and the tip surface of the tool would travel in this plane. The gear shown in Figure 5 cannot, however, be cut in the usual position for if this gear were positioned so that its root cone surface were tangent to the plane 78, the flange 77 would interfere with the tool post or other parts of the tool mechanism. To cut this gear, it is necessary to set it at a greater distance from the tool support or cradle than is required with an ordinary job and to use a tool longer than ordinary to cut the root surface of the work when positioned in the new cutting plane. So, the gear shown in Figure 5 would have to be positioned so so that its root surface is tangent to a plane 79 and an elongated tool T' would have to be used. The angular position of the blank is secured, whether the plane 78 or the plane 79 be the cutting plane, by the adjustment of the base 16 on the frame 10 of the machine and the work can be moved axially by axial adjustment of the work head carrier on the base 16. By means of these two adjustments only, however, it is impossible to maintain the apex 80 of the blank at the point intersection of the axis 81 of the work and the axis 82 of the cradle, as required in order to cut correctly a bevel or hypoid gear. Consequently, with bevel and hypoid gear cutting machines of prior constructions, in which only an angular and an axial adjustment of the work was provided, it was impossible to set a gear of the type shown in Figure 5 to generate its teeth correctly. With the present machine, however, by means of the adjustment of the work head carrier 22 on the plate 24 it is possible to move the work spindle in a direction perpendicular to its axis so that the work spindle can be moved from the position indicated at 81 to the position 81' and the apex of the work made to coincide in its new position 80' with the intersection of the axis 81' of the work spindle and the axis 82 of the cradle. With the present invention, therefore, the gear can be generated in a position in which its axis intersects the axis of the cradle in the gear apex so that tooth profiles of correct curvature can be produced on the work.

Figures 6 and 7 show another application of the present invention to the cutting of bevel gears. It is frequently desirable to offset the apex of the work from the axis of the cradle to secure a localized tooth bearing. To do this with bevel and hypoid gear cutting machines of prior constructions, it was necessary to withdraw the work from the cutting plane in the direction of its axis and advance the cutting tool. In a machine constructed according to the present invention, the required adjustment can be obtained quickly by adjustment of the work alone. Figure 6 is a diagrammatic plan view and Figure 7 a diagrammatic side elevation illustrating how this is done. The tool is indicated at T and the blank at 85. The cutting plane is indicated at 86. The theoretical position for cutting a bevel gear blank is one in which the axis 87 of the blank intersects the axis 82 of the cradle in the blank apex 83. To secure a localized tooth bearing, however, the apex may be offset from the axis of the cradle. With the axial and angular adjustments of the work spindle alone, it is impossible to move the apex out of theoretical position and still maintain it in the cutting plane. This can be done readily with the present invention, however, by adjusting the work head carrier 22 on the base 16 and at the same time adjusting the work spindle laterally from the position 87 to the position 87' to bring the work apex 83 into the position 83'. No advance of the tool is required.

Figures 8 and 9 illustrate diagrammatically in plan and side elevation, respectively, an additional way in which the adjustment of the present invention may be employed. In cutting a hypoid pinion, its apex in general will lie to one side or other of the center line 82. The required position can be obtained very readily on a machine constructed according to the present invention. The root cone surface of the blank 90 is brought into the cutting plane 91 by angular adjustment of the base 16 on the frame 10, the work spindle is advanced the distance indicated by the dimension arrows 92 as required to advance the apex 93 of the work from a position in which the axis of the work spindle intersects the axis 82 of the cradle to a position beyond the axis of the cradle and then the work head carrier 22 is adjusted relative to the plate 24 as indicated by the dimension arrows 94 to bring the apex of the work into the cutting plane as indicated by the position 93'. It will be understood, of course, that the axis 95 of the work spindle will be offset above or below the axis of the cradle as required to correctly generate the hypoid pinion by adjusting the work head 31 on the work head carrier 22. Figure 9 illustrates the position in which the axis 95 of the work spindle is offset below the axis 82 of the cradle.

While the invention has been described in connection with a particular embodiment and in connection with a particular type of machine, it will be understood that it is capable of various further modifications and uses and that this application is intended to cover any variations, uses, or adaptations of the invention, following, in general, the principles of the invention and including such departures from the present disclosure as come within known or customary practise in the gear art and as may be applied to the essential features hereinbefore set forth and as fall within the scope of the invention or the limits of the appended claims.

Having thus described our invention, what we claim is:

1. In a machine for cutting tapered gears, means for adjusting the work support and tool angularly relative to each other, means for adjusting the work axially and means for adjusting the work and tool relatively to each other in a direction perpendicular to the work axis and parallel to the plane in which the angular adjustment takes place.

2. In a machine for cutting tapered gears, means for adjusting the work angularly about one axis, means for adjusting the work radially of said axis and means for adjusting the work in a direction which is perpendicular to the direction of the last named adjustment and parallel to the plane of the angular adjustment.

3. In a machine for generating tapered gears, a tool support, a work support, a cradle on which one of said supports is mounted, and means for effecting angular adjustment of the work support about an axis angularly disposed to the axis of the cradle, means for adjusting the work support in a direction radial of the axis about which the angular adjustment takes place and means for adjusting the work support in a direction perpendicular to the direction of the last named adjustment and also parallel to the plane of the angular adjustment.

4. In a machine for generating tapered gears, a tool support, a work support, a cradle on which one of said supports is mounted, means for offsetting the axis of the work support from the axis of the cradle, means for effecting angular adjustment of the work support about an axis perpendicular to the axis of the cradle, means for adjusting the work support in a direction radial of the axis about which the angular adjustment takes place and means for adjusting the work support in a direction perpendicular to the direction of the last named adjustment and also perpendicular to the direction of the offset adjustment.

5. In a machine for producing tapered gears, a frame, a tool support mounted on the frame, a base angularly adjustable on the frame, a plate mounted on the base, a work head carrier, a work spindle journaled in the work head carrier, means for adjusting the work head carrier relative to the plate, said work head carrier and plate being movable together on the base for adjustment in a direction at right angles to the last named adjustment and axial of the work spindle.

6. In a machine for producing tapered gears, a frame, a tool support mounted on the frame, a base angularly adjustable on the frame, a plate mounted on the base and secured thereon against movement in one direction, a work head carrier, a work spindle journaled in said carrier, and means for adjusting the work head carrier relative to the plate, said work head carrier and plate being movable together on the base in a direction which is at right angles to the direction of the last named adjustment and axial of the work spindle.

7. In a machine for producing tapered gears, a frame, a tool support mounted on the frame, a work head, a work spindle journaled in the work head, a base angularly adjustable on the frame and provided with a slot extending in a direction parallel to the axis of the work spindle, a plate mounted on the base having a tongue adapted to engage in said slot to hold the plate against movement in one direction on the frame, a work head carrier on which the work head is mounted, means for adjusting the work head carrier relative to the plate in a direction perpendicular to the direction of said slot, said plate and work head carrier being movable together on the base in the direction of said slot, and means for securing the work head carrier on the base in any adjusted position.

8. In a machine for producing tapered gears, a work support, a tool support, a rotatable cradle on which one of said supports is mounted, a base angularly adjustable about an axis perpendicular to the axis of the cradle, a plate mounted on the base and secured thereon against movement in one direction, a work head carrier, a work spindle journaled in said carrier, and means for adjusting the work head carrier relative to the plate, said work head carrier and plate being movable together on the base in a direction at right angles to the direction of the last named adjustment and axial of the work spindle.

9. In a machine for producing tapered gears, a work support, a tool support, a rotatable cradle on which one of said supports is mounted, a base angularly adjustable about an axis perpendicular to the axis of the cradle and provided with a slot extending in a direction parallel to the axis of the work spindle, a plate mounted on the base having a tongue adapted to engage in said slot to hold the plate against movement in one direction on the base, a work head carrier on which the work head is mounted, means for adjusting the work head carrier relative to the plate in a direction perpendicular to the direction of said slot, said plate and work head carrier being movable together on the base in the direction of said slot, and means adapted to engage in said slot for securing the work head carrier on the base in any adjusted position.

10. In a machine for producing tapered gears, a work support, a tool support, a work spindle journaled in the work support, a rotatable cradle on which one of said supports is mounted, a base angularly adjustable about an axis perpendicular to the axis of the cradle, a plate mounted on the base and secured thereon against movement in one direction, a work head carrier, means for adjusting the work support on the work head carrier to offset the axis of the work spindle from the axis of the cradle, and means for adjusting the work head carrier relative to the plate, said work head carrier and plate being movable together on the base in a direction at right angles to the direction of said last named adjustment and axial of the work spindle.

11. In a machine for producing tapered gears, a work support, a tool support, a work spindle journaled in the work support, a rotatable cradle on which one of said supports is mounted, a base angularly adjustable about an axis perpendicular to the axis of the cradle and provided with a slot extending in a direction parallel to the axis of the work spindle, a plate mounted on the base having a tongue adapted to engage in said slot to hold the plate against movement in one direction on the base, a work head carrier, means for adjusting the work support on said carrier to offset the axis of the work spindle from the axis of said cradle, means for adjusting the work head carrier relative to the plate in a direction perpendicular to the direction of said slot, said plate and work head carrier being movable together on the base in the direction of said slot and means for securing the work head carrier on the base in any adjusted position.

12. In a machine for producing tapered gears, a work support, a work spindle journaled in the work support, a tool support, a tool reciprocable on the tool support, a rotatable cradle on which one of said supports is mounted, a base angularly adjustable about an axis perpendicular to the axis of the cradle, a plate mounted on the base and secured thereon against adjustment in one direction, a work head carrier on which the work support is mounted, means for adjusting the work head carrier relative to the plate, said work head carrier and plate being movable together on the base in a direction at right angles to the direction of the last named adjustment and axial of the work spindle, means for reciprocating the tool, and means for imparting a continuous indexing rotation to the work spindle.

ALLAN H. CANDEE.
MAGNUS H. JOHANSON.